(12) United States Patent
Tsirtsis et al.

(10) Patent No.: US 8,619,668 B2
(45) Date of Patent: Dec. 31, 2013

(54) MOBILITY MANAGEMENT MODE SELECTION IN MULTIPLE ACCESS WIRELESS NETWORKS

(75) Inventors: Georgios Tsirtsis, London (GB); Kalle I. Ahmavaara, San Diego, CA (US); Gerardo Giaretta, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 762 days.

(21) Appl. No.: 12/131,900

(22) Filed: Jun. 2, 2008

(65) Prior Publication Data

US 2008/0304441 A1 Dec. 11, 2008

Related U.S. Application Data

(60) Provisional application No. 60/942,656, filed on Jun. 7, 2007.

(51) Int. Cl.
*H04W 4/00* (2009.01)

(52) U.S. Cl.
USPC ........... 370/328; 370/331; 370/338; 455/436; 455/432.1; 455/432.3

(58) Field of Classification Search
USPC ............... 370/328, 331, 338; 455/436, 432.1, 455/426.1, 432.3
See application file for complete search history.

(56) References Cited

U.S. PATENT DOCUMENTS

| | | | |
|---|---|---|---|
| 6,904,027 B1 | 6/2005 | Mukherjee | |
| 7,363,376 B2 | 4/2008 | Uhlik et al. | |
| 2002/0136226 A1* | 9/2002 | Christoffel et al. | 370/401 |
| 2003/0014646 A1* | 1/2003 | Buddhikot et al. | 713/184 |
| 2003/0135626 A1* | 7/2003 | Ray et al. | 709/228 |
| 2003/0224788 A1 | 12/2003 | Leung et al. | |
| 2004/0005895 A1* | 1/2004 | Rollender | 455/445 |
| 2004/0213260 A1 | 10/2004 | Leung et al. | |
| 2005/0041650 A1* | 2/2005 | O'Neill | 370/355 |
| 2006/0111107 A1* | 5/2006 | Zhang | 455/435.2 |
| 2006/0123469 A1* | 6/2006 | Lee et al. | 726/4 |
| 2006/0251044 A1 | 11/2006 | Haddad | |
| 2007/0025298 A1* | 2/2007 | Jung | 370/331 |
| 2007/0025370 A1* | 2/2007 | Ghasem et al. | 370/401 |
| 2007/0072605 A1* | 3/2007 | Poczo | 455/432.2 |

(Continued)

FOREIGN PATENT DOCUMENTS

| | | | |
|---|---|---|---|
| JP | 2003501972 A | 1/2003 | |
| WO | 2007023177 | 3/2007 | |

(Continued)

OTHER PUBLICATIONS

International Search Report—PCT/US08/065610—International Search Authority, European Patent Office—Oct. 7, 2008.

(Continued)

*Primary Examiner* — Rasheed Gidado
(74) *Attorney, Agent, or Firm* — S. Hossain Beladi

(57) ABSTRACT

Systems and methodologies are described that facilitate indicating and determining mobility management modes in access identifiers for wireless communications networks. Wireless devices can indicate mobility management modes to be utilized by choosing a target system and communicating the chosen system and a home system to one or more network components. The network components can infer or otherwise determine a mobility management mode based at least in part on a relationship between the target and home systems.

44 Claims, 9 Drawing Sheets

(56) References Cited

U.S. PATENT DOCUMENTS

| | | | |
|---|---|---|---|
| 2007/0160049 A1 | 7/2007 | Xie et al. | |
| 2007/0226780 A1* | 9/2007 | Ronneke | 726/3 |
| 2007/0254661 A1* | 11/2007 | Chowdhury et al. | 455/436 |
| 2007/0258416 A1* | 11/2007 | Yegani et al. | 370/338 |
| 2008/0160994 A1* | 7/2008 | Ala-Vannesluoma et al. | 455/432.1 |
| 2009/0129386 A1* | 5/2009 | Rune | 370/392 |

FOREIGN PATENT DOCUMENTS

| | | |
|---|---|---|
| WO | WO2008099802 A1 | 8/2008 |
| WO | WO2008099857 A1 | 8/2008 |
| WO | WO2008115520 A1 | 9/2008 |

OTHER PUBLICATIONS

Written Opinion—PCT/US08/065610—International Search Authority, European Patent Office—Oct. 7, 2008.

3GPP TSG SA WG2 Architecture—S2#58, Proposal for APN and NAI types, pp. 1-8, QUALCOMM Europe, Jun. 25-29, 2007, Orlando, Florida, U.S.A.

H. Soliman et al., Interactions between PMIPv6 and MIPv6: scenarios and related issues, NETLMN Working Group, Internet-Draft, Apr. 24, 2007, http://tools.ietf.org/html/draft-giaretta-netlmm-mip-interactions-00.

G. Giaretta, Ed., Interactions between PMIPv6 and MIPv6: scenarios and related issues, NETLMM Working Group, Internet-Draft, http://tools.ietf.org/html/draft-giaretta-netlmm-mip-interactions-01.

G. Giaretta, Ed., Interactions between PMIPv6 and MIPv6: scenarios and related issues, NETLMM Working Group, Internet-Draft, Nov. 15, 2007, http://tools.ietf.org/html/draft-giaretta-netlmm-mip-interactions-02.

S. Gundavelli (Editor) et al., Proxy Mobile IPv6, NETLMM WG, Internet-Draft, Nov. 4, 2007, http://tools.ietf.org/html/draft-ietf-netlmm-proxymip6-07.

S. Gundavelli (Editor) et al., Proxy Mobile IPv6, NETLMM WG, Internet-Draft, Dec. 25, 2007, http://tools.ietf.org/html/draft-ietf-netlmm-proxymip6-08.

S. Gundavelli (Editor) et al., Proxy Mobile IPv6, NETLMM WG, Internet-Draft, Feb. 3, 2008, http://tools.ietf.org/html/draft-ietf-netlmm-proxymip6-09.

S. Gundavelli (Editor) et al., Proxy Mobile IPv6, NETLMM WG, Internet-Draft, Feb. 9, 2008, http://tools.ietf.org/html/draft-ietf-netlmm-proxymip6-10.

S. Gundavelli (Editor) et al., Proxy Mobile IPv6, NETLMM WG, Internet-Draft, Feb. 25, 2008, pp. 1-81, http://tools.ietf.org/html/draft-ietf-netlmm-proxymip6-11.

Perkins C et al.,"Mobile Networking Through Mobile IP", IEEE Internet Computing ,pp. 58-69,1998.

Taiwan Search Report—TW097121306—TIPO—Oct. 22, 2011 (071646TW ).

* cited by examiner

MOBILITY MANAGEMENT MODE SELECTION IN MULTIPLE ACCESS WIRELESS NETWORKS

CROSS-REFERENCE TO RELATED APPLICATIONS

This application claims the benefit of U.S. Provisional Patent application Ser. No. 60/942,656 entitled "METHOD AND APPARATUS FOR MOBILITY MANAGEMENT MODE SELECTION IN MULTI-ACCESS SYSTEMS" which was filed Jun. 7, 2007. The entirety of the aforementioned application is herein incorporated by reference.

BACKGROUND

I. Field

The following description relates generally to wireless communications, and more particularly to providing multiple access in wireless communications networks.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long-term evolution (LTE), 3GPP2, ultra mobile broadband (UMB), etc.

Generally, wireless multiple-access communication systems may simultaneously support communication for multiple mobile devices. In addition, such networks are beginning to incorporate subsystems of other networks, such as the above listed networks, worldwide interoperability for microwave access (WiMAX), wireless local area network (WLAN), wireless metropolitan area network (WMAN), and/or components thereof, for example. Such incorporation can introduce access issues with the subsystems resulting from disparate requirements among the subsystems. In this regard, a gateway is typically utilized to provide access to the multiple subsystems and can facilitate seamless handover among the subsystems if desired. There are currently multiple mechanisms for connecting to multiple-access systems and/or subsystems thereof. For example, a mobile device can connect to the multiple-access system or a subsystem while anchored (or not anchored) to a visited or remote gateway. This creates many permutations of possible connection paths, many of which result in different access and mobility management modes.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating determining access and mobility management mode information based at least in part on selection of a packet data network (PDN) gateway by user equipment (UE). For example, if a remote PDN gateway is selected, it can be determined that network based mobility management can be used to provide access. If, on the other hand, the UE requests local access, such access can be provided, and the UE can run host based mobility management to a remote system. To facilitate this functionality, identifiers used by the mobile device when connecting can be modified to include not only a user and home system of the UE, but also the desired target system used to discern the mobility management mode.

According to related aspects, a method that facilitates determining a mobility management mode for wireless communications is provided. The method can include receiving an access identifier comprising a home system and target system for a wireless device. The method can also include inferring a mobility management mode for requested communication based at least in part on a policy and utilizing the mobility management mode in communicating with the wireless device and one or more disparate service providing network components.

Another aspect relates to a wireless communications apparatus. The wireless communications apparatus can include at least one processor configured to determine a mobility management mode to utilize in wireless communications based at least in part on an indication of a home system and target system for a wireless device requesting communications services. The wireless communications apparatus can also include a memory coupled to the at least one processor.

Yet another aspect relates to a wireless communications apparatus for determining a mobility management mode for wireless communications. The wireless communications apparatus can comprise means for receiving an access identifier comprising a home system and target system related to a wireless device. The wireless communications apparatus can additionally include means for determining a mobility management mode for communication with the wireless device based at least in part on the access identifier.

Still another aspect relates to a computer program product, which can have a computer-readable medium including code for causing at least one computer to receive an access identifier comprising a home system and target system for a wireless device. The computer-readable medium can also comprise code for causing the at least one computer to infer a mobility management mode for requested communication based at least in part on the access identifier. Moreover, the computer-readable medium can comprise code for causing the at least one computer to utilize the mobility management mode in communicating with the wireless device and one or more disparate service providing network components.

According to a further aspect, a method for specifying a mobility management mode in wireless communications is provided. The method can comprise selecting a target system based at least in part on a desired mobility management mode. The method can additionally include generating an access identifier comprising the target system and a home system as well as transmitting the access identifier to one or more network components along with a request for accessing the target system.

Another aspect relates to a wireless communications apparatus. The wireless communications apparatus can include at least one processor configured to generate an access identifier for wireless communications based at least in part on a desired mobility management mode, the access identifier comprises a home system and a target system to which connection is desired. The wireless communications apparatus can also include a memory coupled to the at least one processor.

Yet another aspect relates to a wireless communications apparatus that facilitates specifying a mobility management mode in wireless communications. The wireless communications apparatus can comprise means for selecting a target system based at least in part on a desired mobility management mode. The wireless communications apparatus can additionally include means for creating an access identifier comprising the target system and a home system and means for requesting access to the target system, the request comprises the access identifier.

Still another aspect relates to a computer program product, which can have a computer-readable medium including code for causing at least one computer to select a target system based at least in part on a desired mobility management mode. The computer-readable medium can also comprise code for causing the at least one computer to generate an access identifier comprising the target system and a home system. Moreover, the computer-readable medium can comprise code for causing the at least one computer to transmit the access identifier to one or more network components along with a request for communications.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
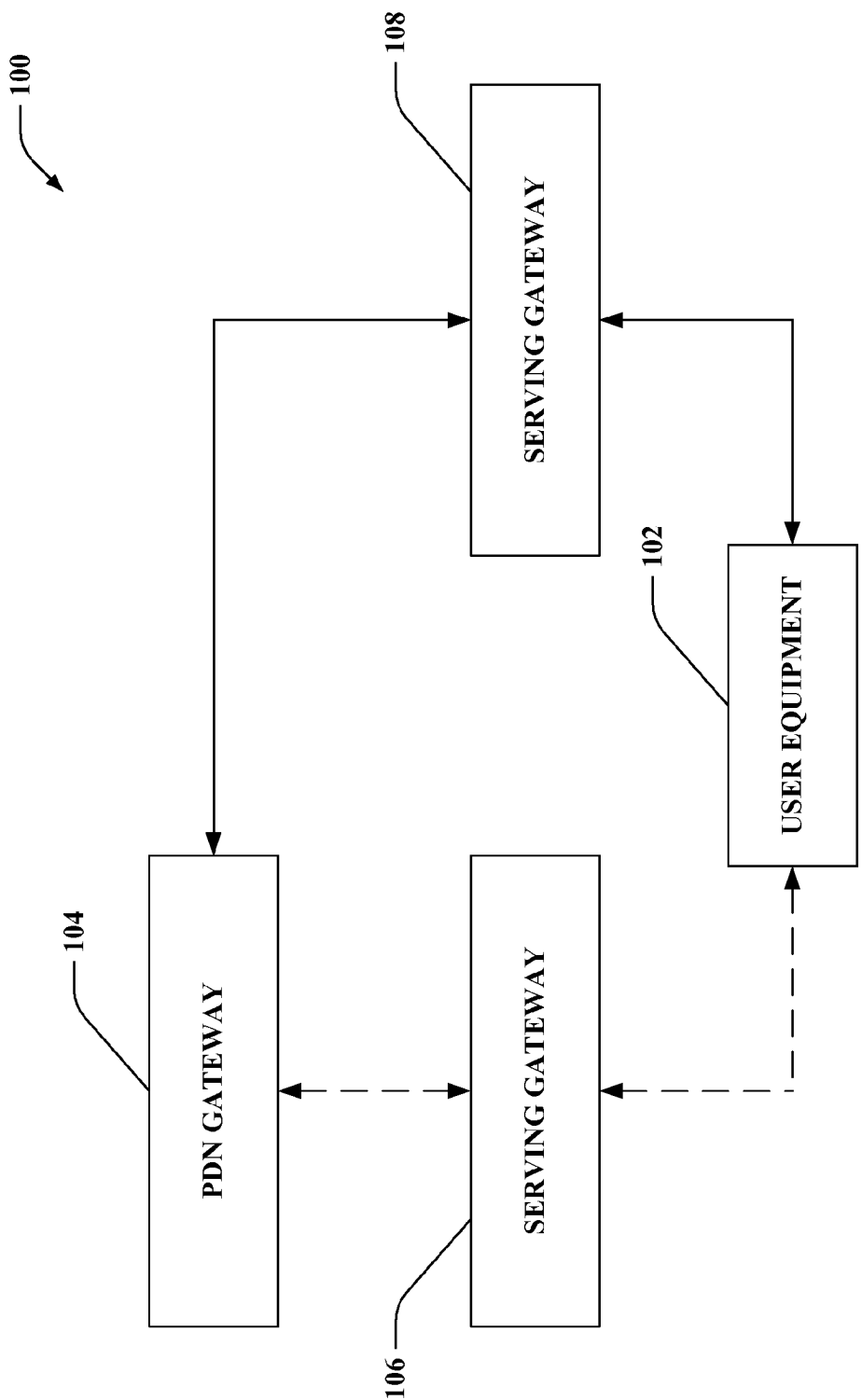
FIG. 1 is an illustration of a wireless communication system utilizing mobility management modes to facilitate communication.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. The system 100 can be of a 3GPP architecture, or a variation thereof such as 3GPP2, 3GPP LTE, and/or the like. System 100 comprises a UE 102 that can receive mobile communication services from a packet data network (PDN) gateway 104 via one or more serving gateways 106 and 108. The serving gateways 106 and 108 allow mobility in the UE 102, as the UE 102 can travel connecting to desirably located serving gateways 106 and 108 to receive services from the PDN gateway 104. Thus, UE 102 communications in the network can be anchored at the PDN gateway 104, in one example. In this regard, the PDN gateway 104 can be responsible for assigning a network address to the UE 102 among other functionalities, and the serving gateway 106 and/or 108 can be responsible for mobility management and authentication as well as other functionalities. In one example, the PDN gateway 104 can participate in a generic packet radio services (GPRS) network. Thus, the PDN gateway can be a gateway GPRS support node (GGSN) that provides access to a GPRS backbone, and the serving gateways 106 and 108 can be service GPRS support nodes (SGSN) that tunnel data from the GGSN to the UE 102.

System 100 can also be a non-3GPP access system architecture, such as a worldwide interoperability for microwave access (WiMAX), wireless local area network (WLAN), wireless metropolitan area network (WMAN), and/or the like. In this regard, the serving gateways 106 and 108 can be routers, WiFi hotspots, and/or other non-3GPP gateways, and the PDN gateway 104 can be one or more layers up to a service backbone. In one example, however, the PDN gateway 104 can connect to multiple backbones providing multiple access services to the UE 102 via serving gateways 106 and 108. In another example, there can be multiple PDN gateways 104 (not shown) connecting to disparate backbones and offering services through one or more serving gateways 106 and/or 108. Thus, the PDN gateway 104 can be remote or visited and/or can be a 3GPP or non-3GPP gateway. As described, this can cause many mobility management mode and access decisions to be made. In this regard, such decisions can be inferred from a target system (e.g., PDN gateway 104 or serving gateway 106 and/or 108) selected by the UE 102. In addition, identifiers used by the 3GPP and non-3GPP networks to establish UE 102 communication can be modified to include the desired target system. It is to be appreciated that a policy can be utilized to determine mobility management mode based at least in part on the target system (and/or the home system or relation thereto).

In one example, the UE 102 can request access to a remote PDN gateway 104 (e.g., a home or non-visited PDN gateway); in this case, the serving gateway 106 and/or 108 can determine that network based mobility can be used to provide access to the requested PDN gateway 104. As mentioned, an identifier for the requested PDN gateway 104 can be encoded in an identifier used by the UE 102 in establishing connection with the serving gateway 106 and/or 108 (such as an international mobile subscriber identity (IMSI), access point name (APN) combination, a modified network access identifier (NAI), and/or the like). The network based mobility, in this example, can utilize S8 protocol in the 3GPP case and/or proximal mobile internet protocol (PMIP) with an S2a/b interface in a non-3GPP access case, to communicate UE 102 data between the remote PDN gateway 104 and other serving or PDN gateways. In this regard, if the UE 102 moves to a disparate public land mobile network (PLMN), the same IP address can be utilized for the UE 102 by serving gateways in the new PLMN for communicating with the remote PDN gateway 104 as the network handles the mobility.

In another example, the UE 102 can request local access, such as to a visited PDN gateway 104 via the current serving gateway 106 (e.g., for expedient access). In this case, the serving gateway 106 and/or 108 can determine that the UE 102 runs host based mobility, such as mobile internet protocol (MIP), also called client MIP (CMIP), and facilitates communication with the UE 102 in this mobility management mode. Additionally, for each mode, the UE 102 can indicate an anchored or non-anchored connection by choice of target system. Where anchored, the serving gateway 106, for example, can handover communication to a disparate serving gateway 108 using the same IP address for the UE 102 whereas non-anchored can assign a new address to the UE 102 at each serving gateway 106 and/or 108. Where the requested target system is a visited PDN gateway 104 anchored in a 3GPP network, S5 interface can be utilized to communicate between the serving gateways 106/108 and the PDN gateway 104. Where non-anchored, no such protocol communication is needed for communicating between the PDN gateway 104 and serving gateways 106/108 as the UE 102 handles the communication. Where the requested target system is a visited PDN gateway 104 anchored in a non-3GPP network, PMIP and/or S2a/b interface can utilized to communicate between the serving gateways 106/108 and the PDN gateway 104. Where non-anchored, S2c interface can be utilized by the UE 102 to communicate directly with the PDN gateway 104. It is to be appreciated that in non-anchored implementations, the UE 102 can connect directly to the PDN gateway 104 (or another gateway) without need for serving gateways 106/108. Moreover, the UE 102 can utilize the mobility management mode implied by the target system selection when accessing the target system.

Figure 2:
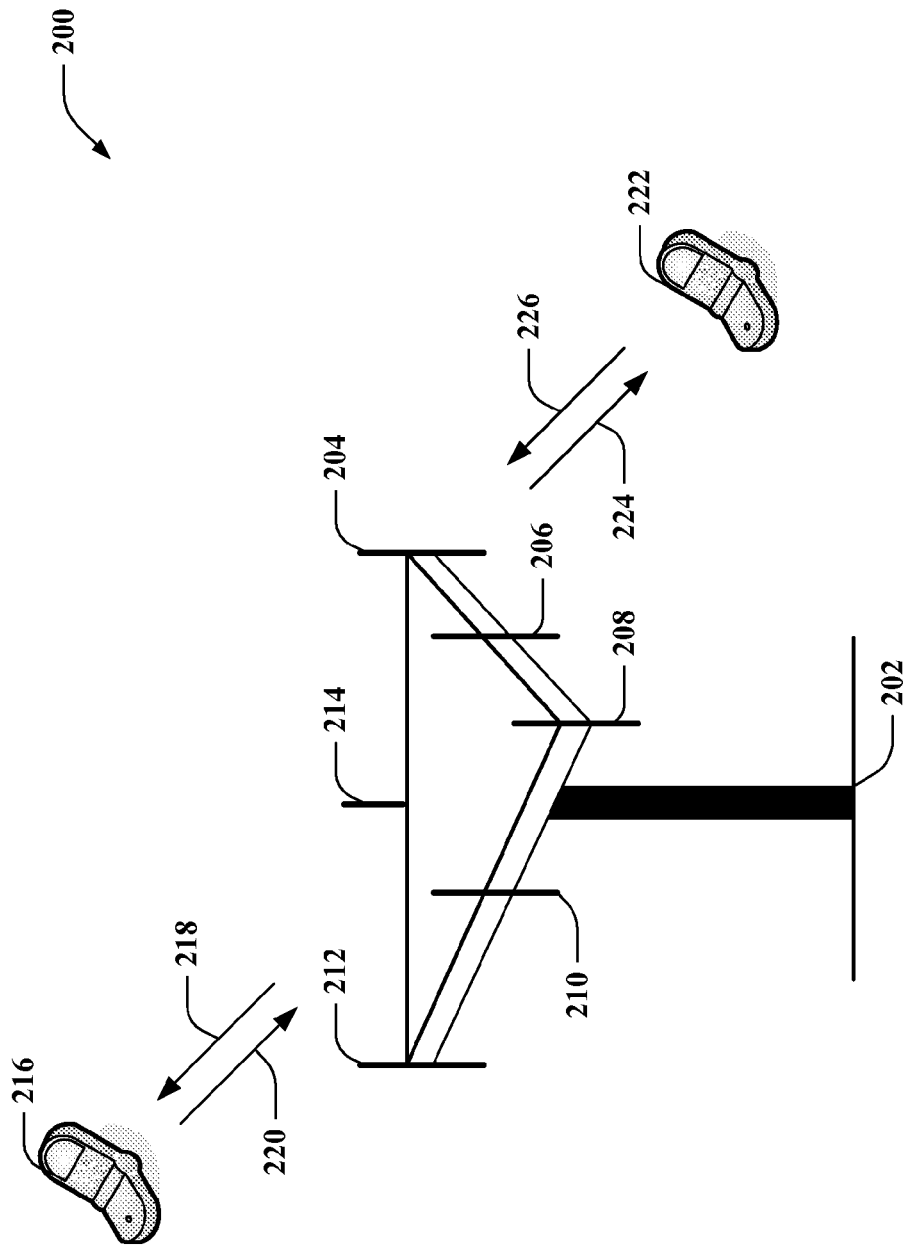
FIG. 2 is an illustration of an example wireless communications system in accordance with various aspects set forth herein.

Turning now to FIG. 2, a wireless communication system 200 is illustrated in accordance with various embodiments presented herein. System 200 comprises a base station 202 that can include multiple antenna groups. For example, one antenna group can include antennas 204 and 206, another group can comprise antennas 208 and 210, and an additional group can include antennas 212 and 214. Two antennas are illustrated for each antenna group; however, more or fewer antennas can be utilized for each group. Base station 202 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 202 can communicate with one or more mobile devices such as mobile device 216 and mobile device 222; however, it is to be appreciated that base station 202 can communicate with substantially any number of mobile devices similar to mobile devices 216 and 222. Mobile devices 216 and 222 can be, for example, cellular phones, smart phones, laptops, handheld communication devices, handheld computing devices, satellite radios, global positioning systems, PDAs, and/or any other suitable device for communicating over wireless communication system 200. As depicted, mobile device 216 is in communication with antennas 212 and 214, where antennas 212 and 214 transmit information to mobile device 216 over a forward link 218 and receive information from mobile device 216 over a reverse link 220. Moreover, mobile device 222 is in communication with antennas 204 and 206, where antennas 204 and 206 transmit information to mobile device 222 over a forward link 224 and receive information from mobile device 222 over a reverse link 226. In a frequency division duplex (FDD) system, forward link 218 can utilize a different frequency band than that used by reverse link 220, and forward link 224 can employ a different frequency band than that employed by reverse link 226, for example. Further, in a time division duplex (TDD) system, forward link 218 and reverse link 220 can utilize a common frequency band and forward link 224 and reverse link 226 can utilize a common frequency band.

Each group of antennas and/or the area in which they are designated to communicate can be referred to as a sector of base station 202. For example, antenna groups can be designed to communicate to mobile devices in a sector of the areas covered by base station 202. In communication over forward links 218 and 224, the transmitting antennas of base station 202 can utilize beamforming to improve signal-to-noise ratio of forward links 218 and 224 for mobile devices 216 and 222. Also, while base station 202 utilizes beamforming to transmit to mobile devices 216 and 222 scattered randomly through an associated coverage, mobile devices in neighboring cells can be subject to less interference as compared to a base station transmitting through a single antenna to all its mobile devices. Moreover, mobile devices 216 and 222 can communicate directly with one another using a peer-to-peer or ad hoc technology as depicted. According to an example, system 200 can be a multiple-input multiple-output (MIMO) communication system. Further, system 200 can utilize substantially any type of duplexing technique to divide communication channels (e.g., forward link, reverse link, . . . ) such as FDD, TDD, and the like.

Additionally, base station 202 can facilitate communication between the mobile devices 216 and 222 and core wireless network components (not shown), such as serving gateways, PDN gateways, authentication, authorization, and accounting (AAA) servers, and the like. It is to be appreciated that such communication can occur through various other underlying network components. In this regard, the mobile devices 216 and 222 can be authenticated with the core network components, and the components can provide services to the mobile devices 216 and 222, as described above, utilizing the base station 202 to transmit the services as signals. Thus, the mobile devices 216 and 222 can provide the underlying components with the identification and access information described previously, such as IMSI, APN, NAI, modified NAI, etc., by transmitting the information to the base station 202.

The base station 202, upon verifying communications from the mobile devices 216 and 222 at various network layers (e.g., physical layer, protocol layer, and the like), can forward the identification and access information to the underlying network components associated with the base station. As mentioned, the identification and access information can comprise a mobile device 216 and/or 222 identifier, a home system indicator for authorization, and a target system indicator to which the mobile device 216 and/or 222 is requesting connection. Thus, depending on the various indicators, as described, underlying network components can determine which access is desired by the mobile device 216 and/or 222 and provide such access utilizing the base station 202 to facilitate communication. This can be based at least in part on a policy, in one example, regarding the selection of target and/or home system.

Figure 3:
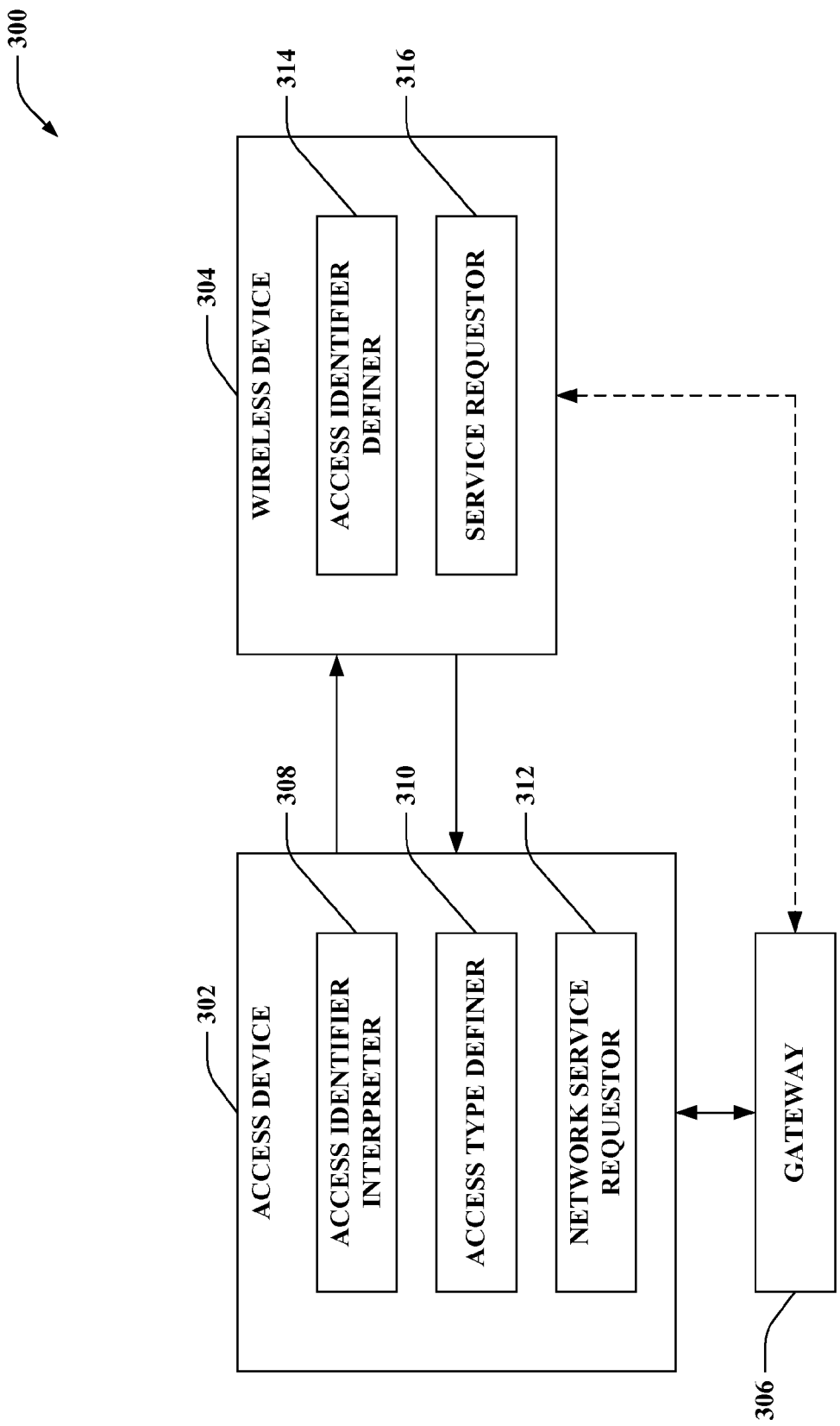
FIG. 3 is an illustration of an example wireless communications system that effectuates communicating access identifiers for mobility management modes.

Now referring to FIG. 3, illustrated is a wireless communications system 300 that can facilitate communicating access request information for initial access, continuing access, and/or access handover. The system 300 includes an access device 302 that can determine access parameters for a wireless device 304 in negotiating handover or initial attachment to one or more gateways 306. The access device 302 can communicate with the gateway 306; moreover, the gateways can provide access between the wireless device 304 and the access device 302. In one example, the wireless device 304 communicates with the gateway 306, and the gateway 306 independently communicates with the access device 302, which can be a core network component, to determine access parameters for the wireless device 304. Additionally, it is to be appreciated that the wireless device 304 can communicate with the gateway 306 and/or access device 302, as mentioned, via a base station, router, WiFi hotspot, or substantially any 3GPP or non-3GPP communications hub, for example. Moreover, the gateway 306 can be a serving gateway, a service providing gateway, and/or the like.

The access device 302 can include an access identifier interpreter 308 that can determine information from an access identifier received from the wireless device 304, such as an identity, home system, target system, and the like as described. The access device 302 can also include an access type definer 310 that can process the access request from the wireless device 304 and accordingly define an access type that the network service requester 312 can utilize to request and acquire wireless network services from the gateway 306, (which can be a PDN or serving gateway, other core network components, and the like in this context). The wireless device 304 can comprise an access identifier definer 314 that can create an access identifier as well as a service requestor 316 to request services from the gateway 306 including the access identifier in the request. The services can include access to other network components, such as an Internet backbone, 3GPP access components, and/or the like, for example.

According to an example, the wireless device 304 can initially request attachment to gateway 306 for 3GPP or non-3GPP access as described. In requesting access for such attachment, the access identifier definer 314 can generate an identifier the service requester 316 can utilize in requesting the attachment. For example, the identifier can comprise information regarding identity of the wireless device 304, a home system for the wireless device 304, and a target system to which the wireless device 304 desires access (e.g., via the gateway 306, or the gateway itself in a local access context). In this regard, the identifier can be an IMSI/APN combination, an extension of NAI to include a target system, and/or the like. Upon requesting access, the access device 302 can receive the access identifier. The access identifier interpreter 308 can determine the information comprised in the identifier, and the access type definer 310 can infer further configuration settings or access parameters based on the information.

In one example, the wireless device 304 can encode a PDN gateway (which can be gateway 306 or can be accessible by gateway 306) into the target system identifier of the access identifier by utilizing the access identifier definer 314 in a 3GPP context; a disparate type of gateway can be encoded in a non-3GPP context. In addition, the access identifier definer 314 can encode a home system that can be the same as or different from the target system. Using 3GPP, the identifier can be an APN and/or IMSI, in one example; for non-3GPP, an extended NAI can be utilized which includes the target system indicator. The service requester 316 can subsequently transmit the identifier to the access device 302 or gateway 306, which can utilize the access device 302 to configure access parameters for the wireless device 304. The access identifier interpreter 308 can interpret the access identifier to determine the home system, target system, and identifier of the wireless device 304.

If non-anchored local or visited network access is requested (e.g., the target system is not related to the home system), the wireless device 304 can provide host based mobility management as described above. The access identifier interpreter 308 can extract the home and target systems, and the access type definer 310 can determine that non-anchored local/visited access is requested. Thus, the network service requester 312 can communicate the request and mobility management information to a serving gateway, such as gateway 306. The host based mobility performed by the wireless device 304 can include utilizing MIP, an S2c interface, and/or the like to communicate with a service providing gateway (such as a PDN gateway or other backbone provider) via the serving gateway 306. It is to be appreciated that the wireless device 304 can connect directly to the service providing gateway as well without needing a serving gateway 306. Additionally, in this access context, if the wireless device 304 is handed over to another gateway, the wireless device 304 performs the mobility management, which can include handling re-authorization procedures, IP address change, and the like.

If anchored access is requested from a local or visited network, the wireless device 304 can assume network based mobility management is provided. Again, the access identifier interpreter 308 can extract the home and target systems, and the access type definer 310 can determine that anchored local/visited access is requested to a PDN gateway or other service providing gateway. Thus, the network service requester 312 can communicate the request and mobility management information to a serving gateway 306, which can utilize S5 interface (in the 3GPP context for example) and/or PMIP (in the non-3GPP context for example) to communicate wireless device 304 data between the serving gateway 306 and the service providing gateway (or other gateways for example). Additionally, in this example, the visited service providing gateway can be stored in a home subscriber server (HSS) as a visited gateway, for instance. In this access context, if the wireless device 304 is handed over to a subsequent serving gateway, if the HSS shows the visited service providing gateway, then the subsequence serving gateway continues to utilize the service providing gateway. However, if the subsequent serving gateway is part of a new PLMN, a new IP address can be assigned to the wireless device 304.

If remote network access is requested (e.g., the target system is, or is related to, the home system), again the wireless device 304 can assume network based mobility management is provided. Also, again, the access identifier interpreter 308 can extract the home and target systems, and the access type definer 310 can determine that remote access is requested to a PDN gateway or other service providing gateway. Thus, the network service requester 312 can communicate the request and mobility management information to serving gateway 306, which can utilize S8 interface (in the 3GPP context for example) and/or PMIP (in the non-3GPP context for example) to communicate wireless device 304 data between the serving gateway 306 and the service providing gateway (such as the PDN gateway or other gateways for example). Additionally, in this example, the remote service providing gateway can be stored in a home subscriber server (HSS) as the remote gateway, for instance. In this access context, if the wireless device 304 is handed over to a subsequence serving gateway, if the HSS shows the remote service providing gateway, the wireless device 304 is connected to the remote service providing gateway via S8 interface between serving gateways and service providing gateways (or PMIP in non-3GPP context) regardless of whether PLMN boundaries are crossed in the handover.

Additionally, in one example, the access device 302 can notify the wireless device 304 of the mobility management mode after parsing the identifier to ensure the wireless device 304 uses the mode determined by the access device 302. It is to be appreciated that in some access contexts the wireless device 304 can convert access types during communication to establish a more static relationship with gateways in a given network if desired. For example, where non-anchored local network access is initially established, the wireless device 304 can attempt to leverage the local access gateway to establish anchored local access or remote access to a service providing gateway by transmitting a new access identifier to the access device 302. Additionally, it is to be appreciated that the access device 302 can be implemented within or accessible by a serving and/or service providing gateway, can exist within an AAA server, can be a stand-alone component, and/or the like. Moreover, the service requester 316 can utilize the mobility management mode selected by the wireless device 304 when accessing the target system via gateway 306.

Figure 4:
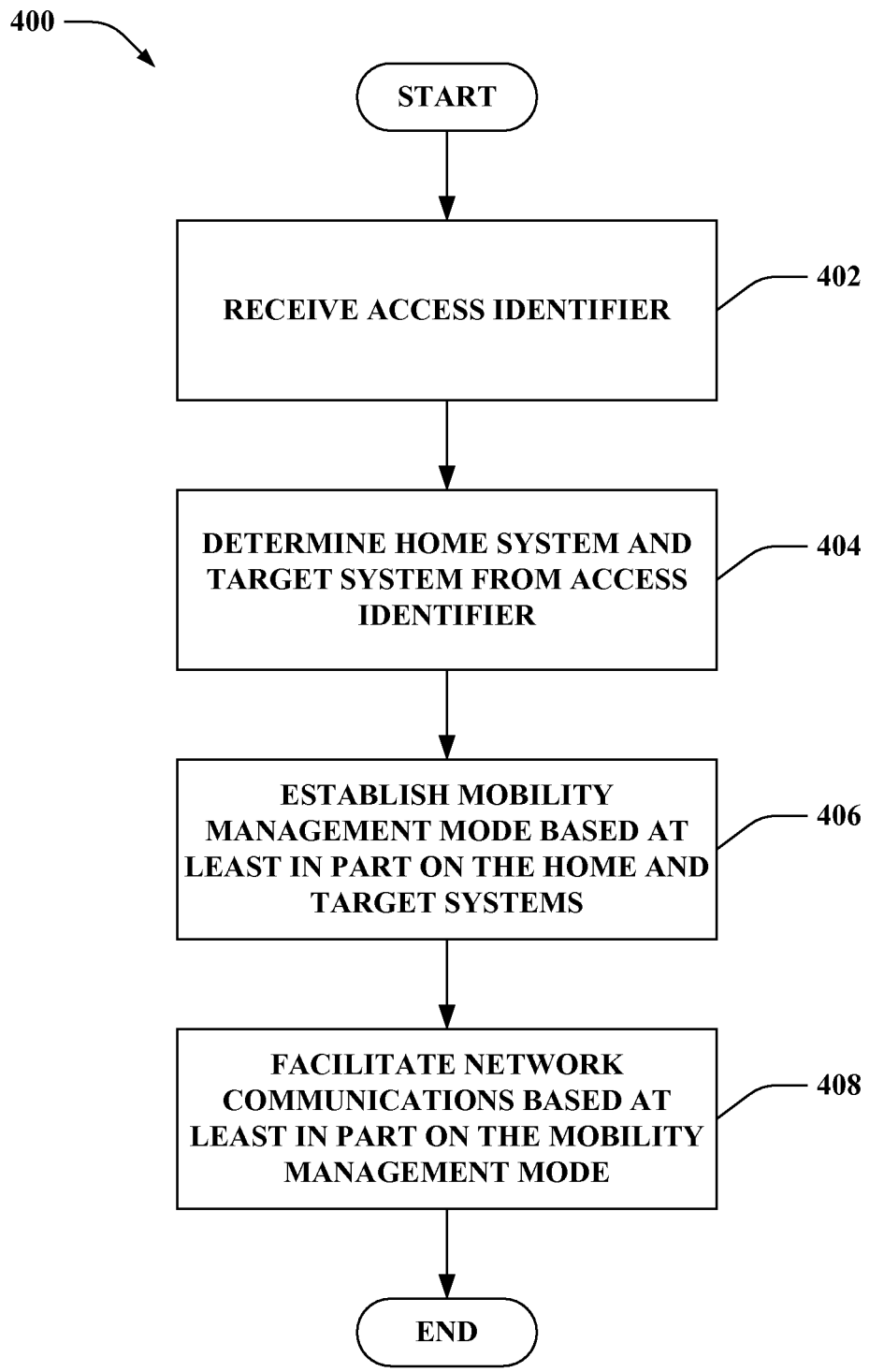
FIG. 4 is an illustration of an example methodology that facilitates determining mobility management mode from an access identifier.
Figure 5:
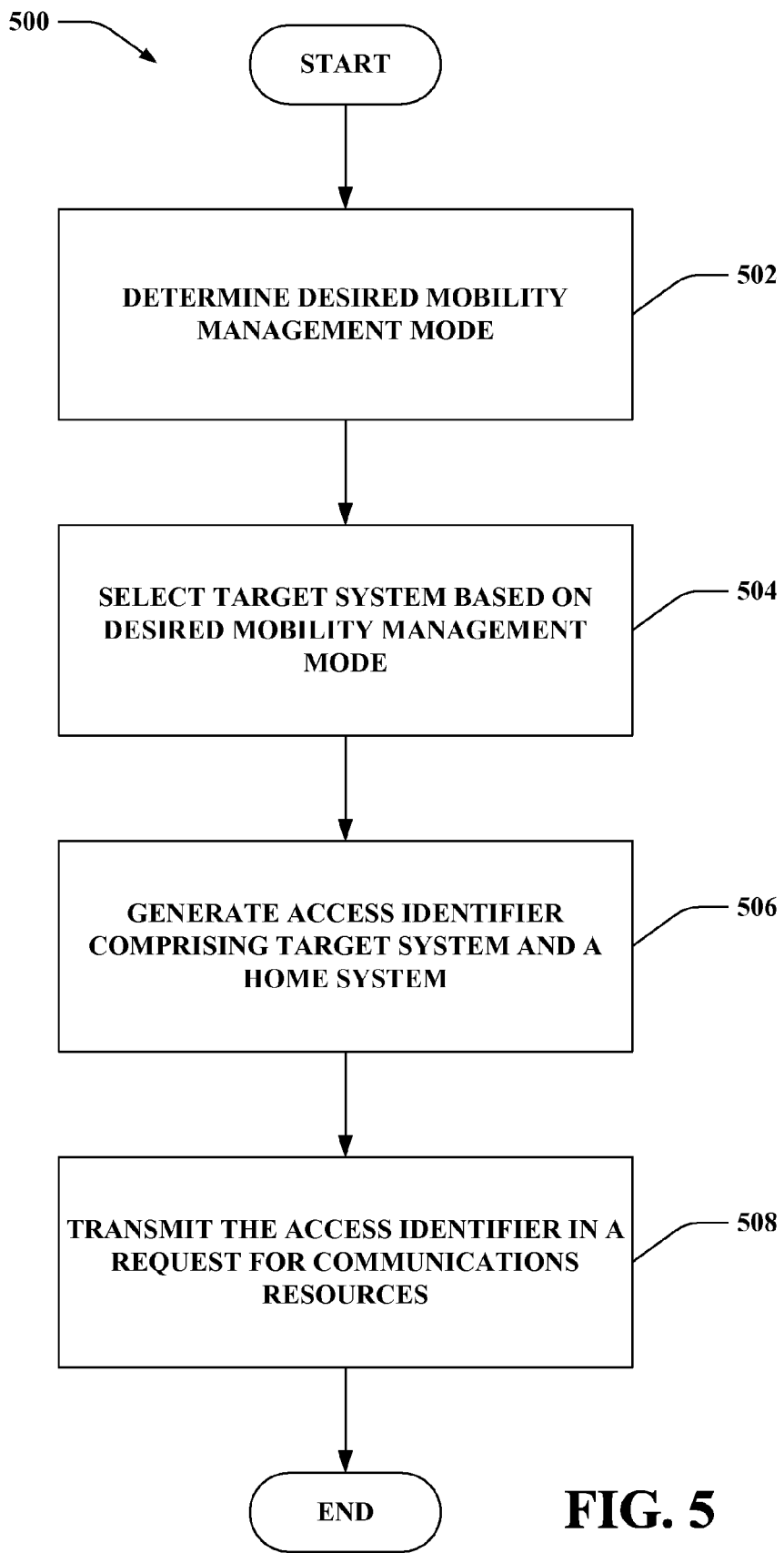
FIG. 5 is an illustration of an example methodology that facilitates generating an access identifier with selected mobility management mode.

Referring to FIGS. 4-5, methodologies relating to utilizing target system selection to indicate mobility management mode for wireless communications are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 4, illustrated is a methodology 400 that facilitates determining a mobility management mode from a received access identifier. At 402, an access identifier is received. This can be from a wireless device, for example, comprising a target system and a home system and can accompany a request for communication resources. At 404, the home system and target system can be determined from the access identifier. These systems can be the same or different, or can be related in one example such that the indication of the systems can be utilized to infer required access parameters, such as protocols and/or interfaces utilized in communication between various network components as described.

At 406, the mobility management mode can be established based at least in part on the home and target systems. The mode can be network or host based depending on the systems. For example, as described above, for some local or visited target systems, host based mobility can be utilized such that a device to which the access identifier relates can maintain mobility context for initial attachment and handover. In another example, as described above, for remote target systems, the network can maintain mobility context such that the device can move amongst various devices without having to change mobility information. At 408, network communications are facilitated based at least in part on the mobility management mode in this regard.

Now referring to FIG. 5, a methodology 500 that facilitates transmitting mobility management mode information in an access identifier is illustrated. At 502, a desired mobility management mode can be determined. This can be based at least in part on desired access, expediency or quality of such access, available protocols, and/or the like. For example, the mode can be based on whether 3GPP or non-3GPP access is desired, whether MIP or PMIP is supported, etc. At 504, a target system is selected based on the desired mobility management mode. For example, the target system can be a local or remote anchored or non-anchored 3GPP or non-3GPP gateway or other service providing component. The gateway can connect to a backbone offering a variety of services, such as Internet access, 3GPP LTE services, and/or the like.

At 506, an access identifier can be generated based on the target system and a home system. The access identifier can also identify the generating device. At 508, the access identifier is transmitted in a request for communications resources. The resources can relate to a plurality of services, including Internet access, voice services, other data service, and/or the like as described. The receiver of the request can determine mobility management mode based on the access identifier as described previously such that the receiver and transmitter can utilize like mobility management modes.

It will be appreciated that, in accordance with one or more aspects described herein, inferences can be made regarding determining mobility management modes from specified target and home systems as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selecting target systems for desired mobility management mode specification, determining mobility management mode from the selected target system and home system, determining whether the target system is 3GPP or non-3GPP, anchored or non-anchored, and local or remote, and/or the like.

Figure 6:
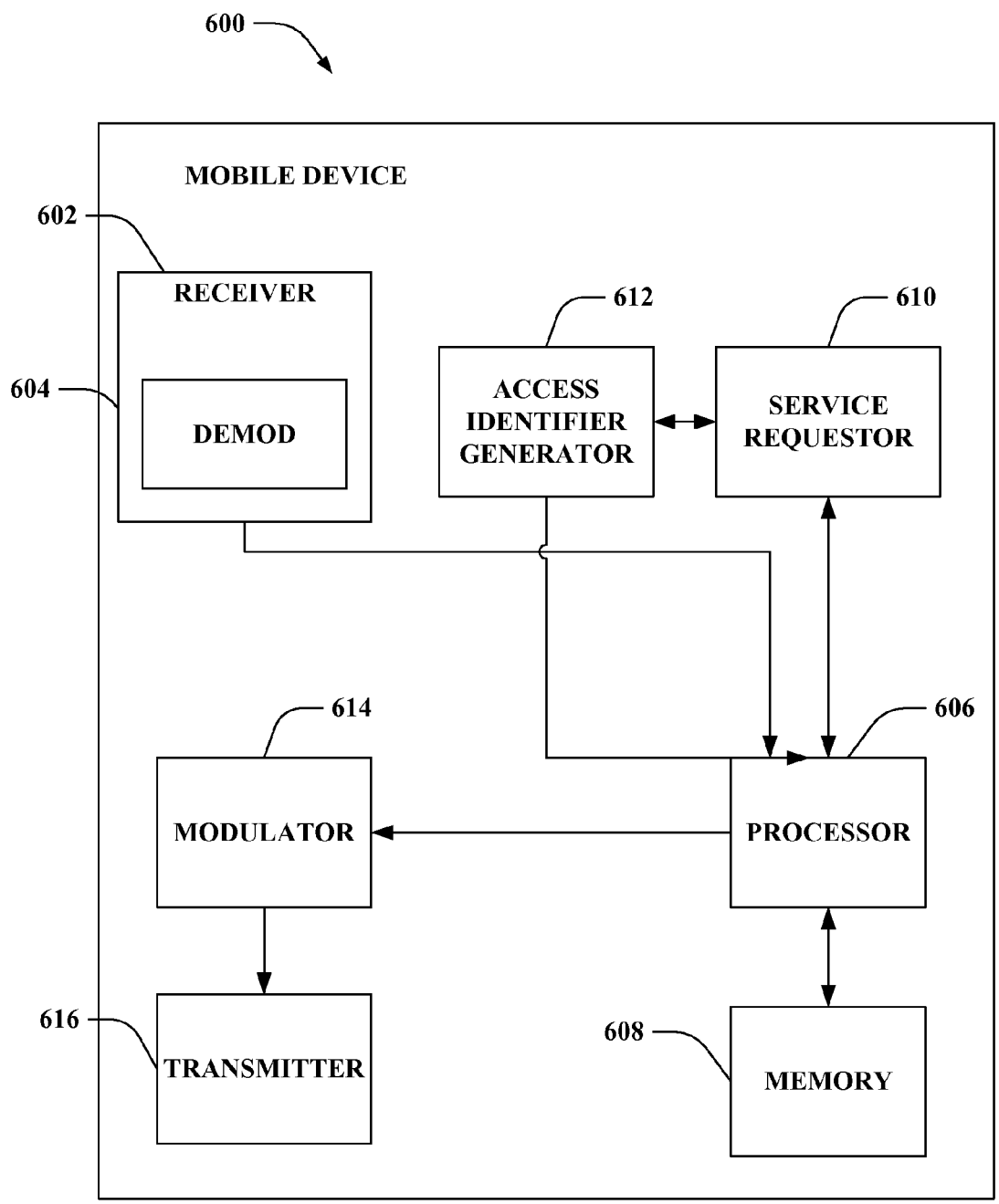
FIG. 6 is an illustration of an example mobile device that facilitates creating an access identifier.

FIG. 6 is an illustration of a mobile device 600 that facilitates generating and transmitting access identifiers based at least in part on desired mobility management modes. Mobile device 600 comprises a receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can comprise a demodulator 604 that can demodulate received symbols and provide them to a processor 606 for channel estimation. Processor 606 can be a processor dedicated to analyzing information received by receiver 602 and/or generating information for transmission by a transmitter 616, a processor that controls one or more components of mobile device 600, and/or a processor that both analyzes information received by receiver 602, generates information for transmission by transmitter 616, and controls one or more components of mobile device 600.

Mobile device 600 can additionally comprise memory 608 that is operatively coupled to processor 606 and that can store data to be transmitted, received data, information related to available channels, data associated with analyzed signal and/or interference strength, information related to an assigned channel, power, rate, or the like, and any other suitable information for estimating a channel and communicating via the channel. Memory 608 can additionally store protocols and/or algorithms associated with estimating and/or utilizing a channel (e.g., performance based, capacity based, etc.).

It will be appreciated that the data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject systems and methods is intended to comprise, without being limited to, these and any other suitable types of memory.

Processor 606 can further be operatively coupled to a service requester 610 that can request communications resources from one or more wireless networks; the networks can be 3GPP or non-3GPP as described, for example. The service requester 610 and/or processor 606 can also be coupled to an access identifier generator 612 that can create access identifiers that indicate a target and home system for desired communication. The access identifier can be created to imply a mobility management mode based at least in part on the chosen target system and the home system as described herein. Mobile device 600 still further comprises a modulator 614 and transmitter 616 that respectively modulate and transmit signals to, for instance, a base station, another mobile device, etc. Although depicted as being separate from the processor 606, it is to be appreciated that the service requester 610, access identifier generator 612, demodulator 604, and/or modulator 614 can be part of the processor 606 or multiple processors (not shown).

Figure 7:
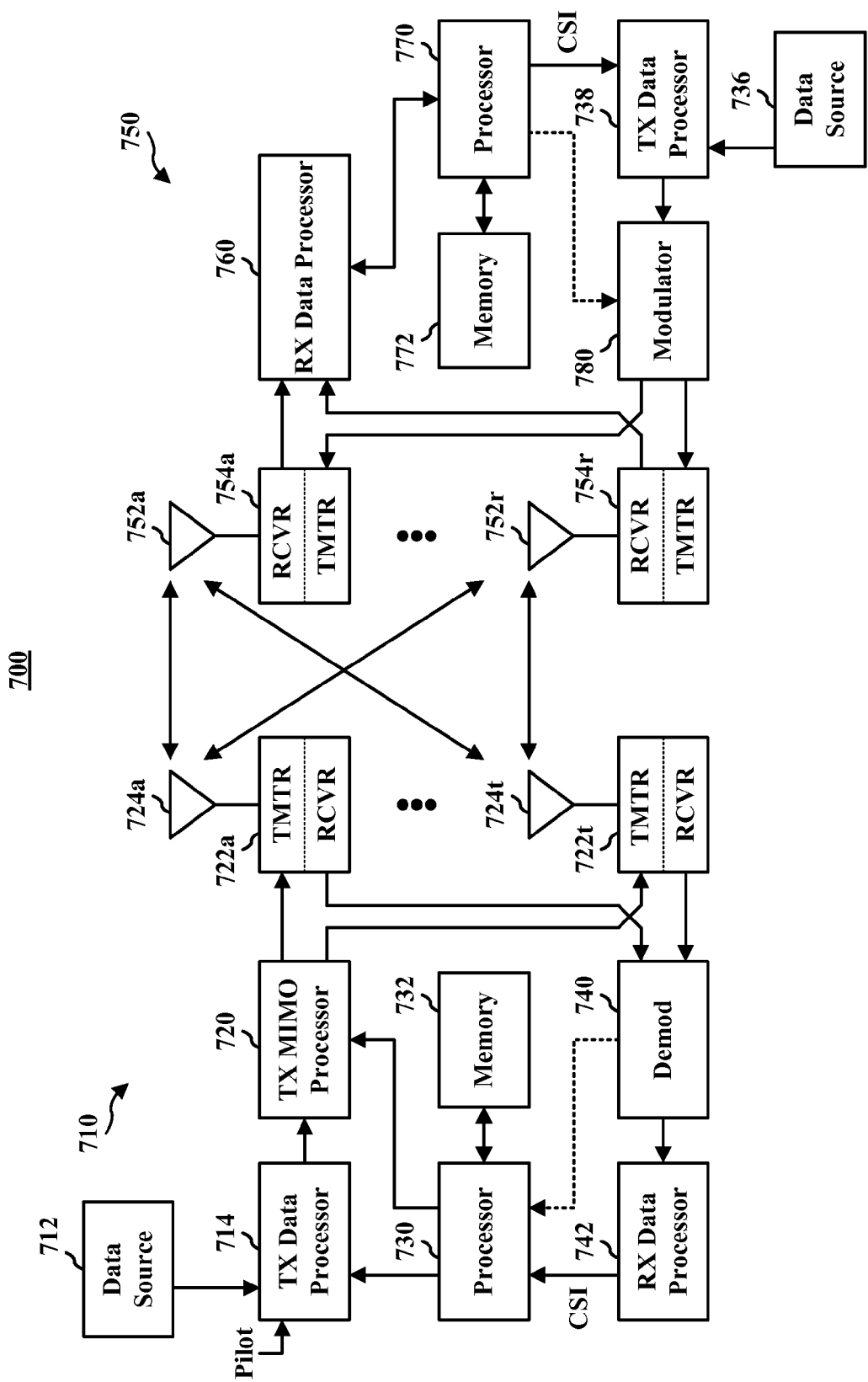
FIG. 7 is an illustration of an example wireless network environment that can be employed in conjunction with the various systems and methods described herein.

FIG. 7 shows an example wireless communication system 700. The wireless communication system 700 depicts one base station 710 and one mobile device 750 for sake of brevity. However, it is to be appreciated that system 700 can include more than one base station and/or more than one mobile device, wherein additional base stations and/or mobile devices can be substantially similar or different from example base station 710 and mobile device 750 described below. In addition, it is to be appreciated that base station 710 and/or mobile device 750 can employ the systems (FIGS. 1-3 and 6) and/or methods (FIGS. 4-5) described herein to facilitate wireless communication there between.

At base station 710, traffic data for a number of data streams is provided from a data source 712 to a transmit (TX) data processor 714. According to an example, each data stream can be transmitted over a respective antenna. TX data processor 714 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 750 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 730.

The modulation symbols for the data streams can be provided to a TX MIMO processor 720, which can further process the modulation symbols (e.g., for OFDM). TX MIMO processor 720 then provides NT modulation symbol streams to $N_T$ transmitters (TMTR) 722a through 722t. In various embodiments, TX MIMO processor 720 applies beamforming weights to the symbols of the data streams and to the antenna from which the symbol is being transmitted.

Each transmitter 722 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 722a through 722t are transmitted from $N_T$ antennas 724a through 724t, respectively.

At mobile device 750, the transmitted modulated signals are received by $N_R$ antennas 752a through 752r and the received signal from each antenna 752 is provided to a respective receiver (RCVR) 754a through 754r. Each receiver 754 conditions (e.g., filters, amplifies, and downconverts) a respective signal, digitizes the conditioned signal to provide samples, and further processes the samples to provide a corresponding "received" symbol stream.

An RX data processor 760 can receive and process the $N_R$ received symbol streams from $N_R$ receivers 754 based on a particular receiver processing technique to provide $N_T$ "detected" symbol streams. RX data processor 760 can demodulate, deinterleave, and decode each detected symbol stream to recover the traffic data for the data stream. The processing by RX data processor 760 is complementary to that performed by TX MIMO processor 720 and TX data processor 714 at base station 710.

A processor 770 can periodically determine which precoding matrix to utilize as discussed above. Further, processor 770 can formulate a reverse link message comprising a matrix index portion and a rank value portion.

The reverse link message can comprise various types of information regarding the communication link and/or the received data stream. The reverse link message can be processed by a TX data processor 738, which also receives traffic data for a number of data streams from a data source 736, modulated by a modulator 780, conditioned by transmitters 754a through 754r, and transmitted back to base station 710.

At base station 710, the modulated signals from mobile device 750 are received by antennas 724, conditioned by receivers 722, demodulated by a demodulator 740, and processed by a RX data processor 742 to extract the reverse link message transmitted by mobile device 750. Further, processor 730 can process the extracted message to determine which precoding matrix to use for determining the beamforming weights.

Processors 730 and 770 can direct (e.g., control, coordinate, manage, etc.) operation at base station 710 and mobile device 750, respectively. Respective processors 730 and 770 can be associated with memory 732 and 772 that store program codes and data. Processors 730 and 770 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 8:
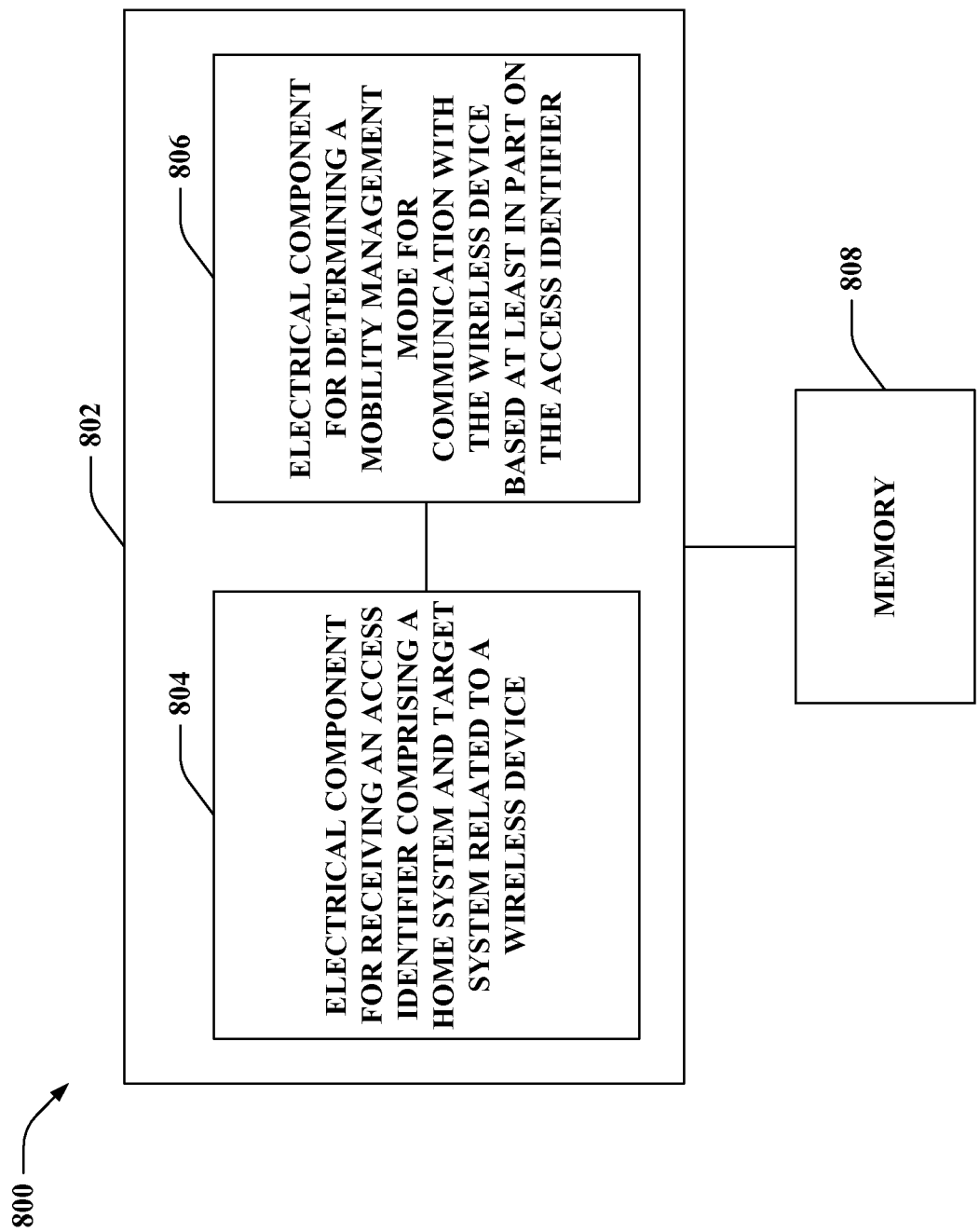
FIG. 8 is an illustration of an example system that determines a mobility management mode from an access identifier.

With reference to FIG. 8, illustrated is a system 800 that facilitates determining a mobility management mode for wireless communications. For example, system 800 can reside at least partially within a base station, mobile device, underlying network component such as a gateway, AAA server, etc. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component for receiving an access identifier comprising a home system and target system related to a wireless device 804. For example, the target and home systems can indicate a desired access type for the device transmitting the access identifier. Further, logical grouping 802 can comprise an electrical component for determining a mobility management mode for communication with the wireless device based at least in part on the access identifier 806. For example, as described previously, the access identifier can include a relationship between the home and target system, which can indicate whether the requesting device desires anchored or non-anchored 3GPP or non-3GPP local or remote gateway access. Additionally, system 800 can include a memory 808 that retains instructions for executing functions associated with electrical components 804 and 806. While shown as being external to memory 808, it is to be understood that one or more of electrical components 804 and 806 can exist within memory 808.

Figure 9:
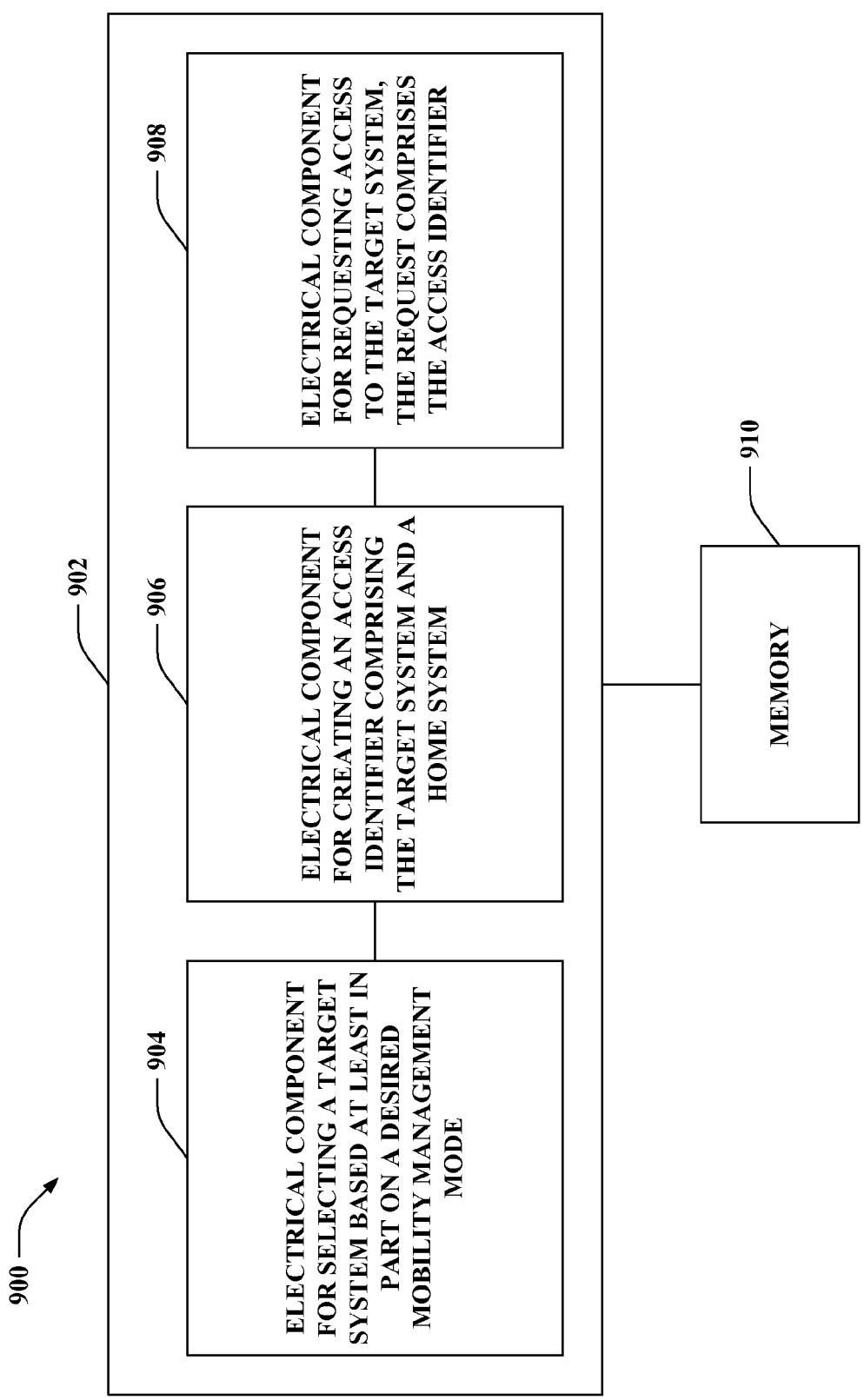
FIG. 9 is an illustration of an example system that creates an access identifier indicating a mobility management mode.

Turning to FIG. 9, illustrated is a system 900 that defines an access identifier for a desired mobility management mode. System 900 can reside within a base station, mobile device, etc., for instance. As depicted, system 900 includes functional blocks that can represent functions implemented by a processor, software, or combination thereof (e.g., firmware). System 900 includes a logical grouping 902 of electrical components that facilitate generating and transmitting the access identifier. Logical grouping 902 can include an electrical component for selecting a target system based at least in part on a desired mobility management mode 904. For example, as described, the target system selection can correlate to the desired mobility management mode. In one example, where the target system is different from the home system, local access is assumed, and where they are related, remote access can be assumed. Moreover, logical grouping 902 can include an electrical component for creating an access identifier comprising the target system and a home system 906. Further, logical grouping 902 can comprise an electrical component for requesting access to the target system, the request comprises the access identifier 908. Thus, the access identifier can be interpreted by the target system with which communications is requested to determine the mobility management mode as described herein. Additionally, system 900 can include a memory 910 that retains instructions for executing functions associated with electrical components 904, 906, and 908. While shown as being external to memory 910, it is to be understood that electrical components 904, 906, and 908 can exist within memory 910.

In conjunction with the described embodiments, a first wireless communications apparatus is disclosed that includes means for receiving an access identifier and for selecting a mobility management mode for communication with a wireless device. For example, the means for receiving the access identifier and for selecting the mobility management mode may include the processor used to implement the system 800 of FIG. 8.

The first wireless communications apparatus may also include means for providing a notification of a selected mobility management mode to a wireless device. For example, the means for providing the notification may include the transmitter(s) 722a-722t of FIG. 7, the TX MIMO processor 720 of FIG. 7, and the TX data processor 714 of FIG. 7.

In conjunction with the described embodiments, a second wireless communications apparatus is disclosed that includes means for creating an access identifier. For example, the means for creating the access identifier may include the access identifier generator 612 of FIG. 6.

The second wireless communications apparatus may also include means for transmitting the access identifier to an access device along with a request for accessing the target network. For example, the means for transmitting may include the transmitter 616 of FIG. 6.

The second wireless communications apparatus may also include means for receiving, from the access device, a notification of a selected mobility management mode. For example, the means for receiving may include the receiver 602 of FIG. 6.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method comprising:
    receiving at an access device, an access identifier from a wireless device, wherein the access identifier includes information regarding a home network and a target network of the wireless device, and wherein the access device is external to the target network;
    determining access parameters based on the received access identifier, wherein the access parameters indicate anchored access, non-anchored access, or remote access between the home network and the target network;
    selecting a mobility management mode for requested communication based on the access parameters;
    sending a notification of the selected mobility management mode from the access device to the wireless device; and
    utilizing the selected mobility management mode in communicating with the wireless device and one or more disparate service providing network components.

2. The method of claim 1, further comprising determining a relationship between the home network and the target network in response to receiving the access identifier.

3. The method of claim 2, wherein the home network is related to the target network and a network based mobility is the selected mobility management mode.

4. The method of claim 3, wherein the target network is third generation partnership project (3GPP) long term evolution (LTE) and the network based mobility utilizes an S5 or S8 interface to communicate with the one or more disparate service providing network components.

5. The method of claim 3, wherein the network based mobility utilizes proximal mobile internet protocol (PMIP) with an S2a/b interface to communicate with the one or more disparate service providing network components.

6. The method of claim 2, wherein the home network is unrelated to the target network and a host based mobility is the selected mobility management mode.

7. The method of claim 6, wherein the host based mobility utilizes a mobile internet protocol (MIP) to communicate with the one or more disparate service providing network components.

8. The method of claim 1, wherein the selected mobility management mode includes a host based mobility management mode when the access parameters indicate non-anchored access between the home network and the target network, wherein the host based mobility management mode utilizes a mobile internet protocol to communicate with the one or more disparate service providing network components, and wherein the non-anchored access indicates that the home network and the target network are unrelated.

9. The method of claim 1, wherein the selected mobility management mode includes a network based mobility management mode when the access parameters indicate anchored access between the home network and the target network, wherein the network based mobility management mode utilizes an S5 or S8 interface to communicate with the one or more disparate service providing network components, and wherein the anchored access indicates that the target network is configurable to assign a network address to the home network.

10. The method of claim 1, wherein the selected mobility management mode includes a network based mobility management mode when the access parameters indicate remote access between the home network and the target network, wherein the network based mobility management mode utilizes an S5 or S8 interface to communicate with the one or more disparate service providing network components, and wherein the remote access indicates that the target network and the home network are related.

11. A wireless communications apparatus, comprising:
at least one processor configured to:
receive an access identifier of a wireless device, wherein the access identifier includes information regarding a home network and a target network, and wherein the at least one processor is external to the target network;
determine access parameters based on the received access identifier, wherein the access parameters indicate anchored access, non-anchored access, or remote access between the home network and the target network;
select a mobility management mode to utilize in wireless communications based at least in part on the access parameters; and
send a notification message of the selected mobility management mode to the wireless device; and
a memory coupled to the at least one processor.

12. The wireless communications apparatus of claim 11, wherein the at least one processor is further configured to facilitate utilization of the selected mobility management mode by one or more disparate wireless network components.

13. The wireless communications apparatus of claim 11, wherein the home network is unrelated to the target network and the at least one processor selects a host based mobility as the selected mobility management mode.

14. The wireless communications apparatus of claim 13, wherein the host based mobility utilizes a mobile internet protocol (MIP) to communicate with one or more disparate wireless network components.

15. The wireless communications apparatus of claim 11, wherein the home network information and the target network information are communicated by the wireless device in a modified network access identifier (NAI).

16. A wireless communications apparatus comprising:
means for receiving an access identifier and for selecting a mobility management mode for communication with a wireless device, wherein the access identifier includes information regarding a home network and a target network of a wireless device, wherein access parameters are determined based on the received access identifier, wherein the access parameters indicate anchored access, non-anchored access, or remote access between the home network and the target network, wherein the access parameters are determined external to the target network, and wherein the mobility management mode is selected based at least in part on the access parameters; and
means for providing a notification of the selected mobility management mode to the wireless device.

17. The wireless communications apparatus of claim 16, wherein the selected mobility management mode is selected based in part on a relationship between the home network and target network.

18. The wireless communications apparatus of claim 17, wherein the home network is related to the target network and network based mobility is the selected mobility management mode.

19. The wireless communications apparatus of claim 18, wherein the target network is third generation partnership project (3GPP) long term evolution (LTE) and the network based mobility utilizes an S5 or S8 interface to communicate with one or more disparate service providing network components.

20. The wireless communications apparatus of claim 18, wherein the network based mobility utilizes proximal mobile internet protocol (PMIP) with an S2a/b interface to communicate with one or more disparate service providing network components.

21. The wireless communications apparatus of claim 17, wherein the home network is unrelated to the target network and host based mobility is the selected mobility management mode.

22. The wireless communications apparatus of claim 21, wherein the host based mobility utilizes a mobile internet protocol (MIP) to communicate with the one or more disparate service providing network components.

23. A non-transitory computer-readable medium comprising instructions that, when executed by a computer, cause the computer to:
receive an access identifier including information regarding a home network and a target network of a wireless device, wherein the computer is external to the target network;
determine access parameters based on the received access identifier, wherein the access parameters indicate anchored access, non-anchored access, or remote access between the home network and the target network;
select a mobility management mode for requested communication based at least in part on the access parameters;
send a notification of the selected mobility management mode to the wireless device; and
utilize the selected mobility management mode in communicating with the wireless device and one or more disparate service providing network components.

24. A method comprising:
selecting, at a wireless device, a target network based at least in part on a desired mobility management mode;
generating, at the wireless device, an access identifier including information regarding the target network and information regarding a home network;
transmitting the access identifier to an access device along with a request for accessing the target network; and
receiving, from the access device, a notification of a selected mobility management mode corresponding to access parameters indicating anchored access, non-anchored access, or remote access between the home network and the target network based on the access identifier.

25. The method of claim 24, wherein the selected target network is a remote gateway indicating a network based mobility management mode.

26. The method of claim 25, wherein the selected remote gateway is a third generation partnership project (3GPP) long term evolution (LTE) packet data network (PDN) gateway indicating that an S8 interface is to be utilized in communication with the PDN gateway.

27. The method of claim 24, wherein the selected target network is a non-anchored visited gateway indicating a host based mobility management mode.

28. The method of claim 24, further comprising receiving resources based on the request for accessing the target network and adhering the mobility management mode in utilizing the resources.

29. A wireless communications apparatus, comprising:
at least one processor configured to:
generate an access identifier for wireless communications based at least in part on a desired mobility management mode, wherein the access identifier includes information regarding a home network and information regarding a target network to which connection is desired;
transmit the access identifier to an access device along with a request for accessing the target network; and
receive, from the access device, a notification of a selected mobility management mode corresponding to access parameters indicating anchored access, non-anchored access, or remote access between the home network and the target network based on the access identifier; and
a memory coupled to the at least one processor.

30. The wireless communications apparatus of claim 29, wherein the at least one processor is further configured to select the target network based at least in part on the desired mobility management mode.

31. The wireless communications apparatus of claim 30, wherein the selected target network is a remote gateway indicating a network based mobility management mode.

32. The wireless communications apparatus of claim 31, wherein the selected remote gateway is a third generation partnership project (3GPP) long term evolution (LTE) packet data network (PDN) gateway indicating that an S8 interface is to be utilized in communication with the PDN gateway.

33. The wireless communications apparatus of claim 30, wherein the selected target network is a non-anchored visited gateway indicating a host based mobility management mode.

34. The wireless communications apparatus of claim 29, wherein the at least one processor is further configured to request access to the target network specifying the access identifier in the request.

35. The wireless communications apparatus of claim 34, wherein the at least one processor is further configured to receive resources related to the access request and adhere the mobility management mode in utilizing the resources.

36. A wireless communications apparatus comprising:
means for creating an access identifier including information regarding a target network and information regarding a home network, wherein the target network is based at least in part on a desired mobility management mode;
means for transmitting the access identifier to an access device along with a request for accessing the target network; and
means for receiving, from the access device, a notification of a selected mobility management mode corresponding to access parameters indicating anchored access, non-anchored access, or remote access between the home network and the target network based on the access identifier.

37. The wireless communications apparatus of claim 36, wherein the selected target network is a remote gateway indicating a network based mobility management mode.

38. The wireless communications apparatus of claim 37, wherein the selected remote gateway is a third generation partnership project (3GPP) long term evolution (LTE) packet data network (PDN) gateway indicating that an S8 interface is to be utilized in communication with the PDN gateway.

39. The wireless communications apparatus of claim 36, wherein the selected target network is a non-anchored visited gateway indicating a host based mobility management mode.

40. A non-transitory computer-readable medium comprising instructions that, when executed by a computer, cause the computer to:
select, at a wireless device, a target network based at least in part on a desired mobility management mode;
generate, at the wireless device, an access identifier including information regarding the target network and information regarding a home network;
transmit the access identifier to an access device along with a request for communications; and
receive, from the access device, a notification of a selected mobility management mode corresponding to access parameters indicating anchored access, non-anchored access, or remote access between the home network and the target network based on the access identifier.

41. The non-transitory computer-readable medium of claim 40, wherein the selected target network is a remote gateway indicating a network based mobility management mode.

42. The non-transitory computer-readable medium of claim 41, wherein the selected remote gateway is a third generation partnership project (3GPP) long term evolution (LTE) packet data network (PDN) gateway indicating that an S8 interface is to be utilized in communication with the PDN gateway.

43. The method of claim 24, wherein generating the access identifier comprises encoding, by the wireless device, the information regarding the target network and the information regarding the home network into an identifier used by the wireless device to establish communication with the home network.

44. The method of claim 43, wherein the generated access identifier comprises a modified international mobile subscriber identity (IMSI), a modified access point name (APN), a modified network access identifier (NAI), or any combination thereof.

* * * * *